June 7, 1927.
S. RUBEN
1,631,764
ELECTROSTATIC RELAY DEVICE
Filed Feb. 15, 1926
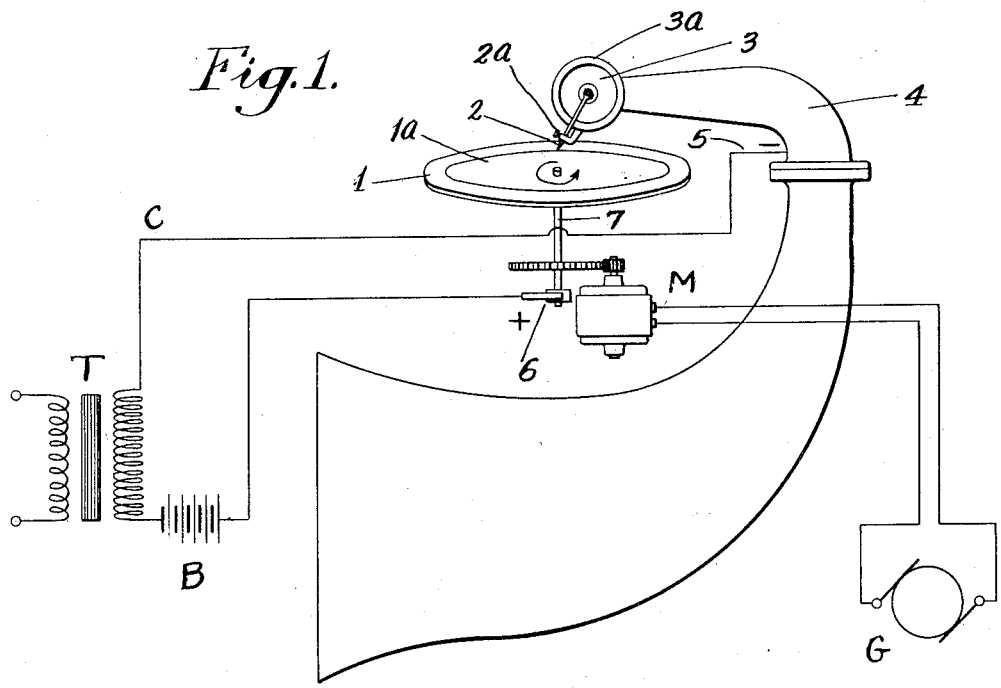
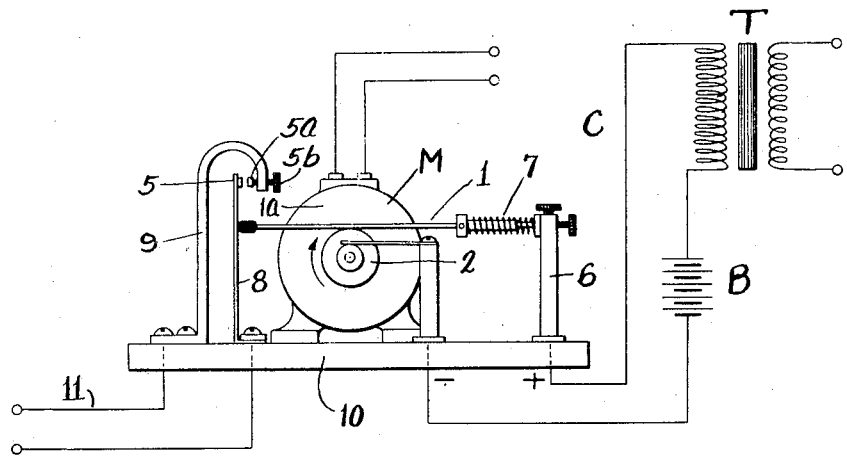
Inventor
SAMUEL RUBEN
By his Attorney Patented June 7, 1927.

1,631,764

UNITED STATES PATENT OFFICE.

SAMUEL RUBEN, OF NEW YORK, N. Y.

ELECTROSTATIC RELAY DEVICE.

Application filed February 15, 1926. Serial No. 88,432.

This invention relates to an electrostatic relay device, and more particularly it relates to an apparatus of this character which operates through variations of electrostatic forces between the electrodes of an asymmetrically conductive couple, due to oscillations impressed upon the circuit connecting its elements. The object of the invention is to provide an efficient device by which electrical impulses of low values are applicable to control amplified current through variations of an electrostatic field surrounding an asymmetrically conductive couple.

Broadly, my invention consists of an apparatus for the amplified reproduction of received electrical impulses, audio or radio frequency oscillations or other signals, through varying the normally constant electrostatic forces established at the contacting area of the electrodes of an asymmetrically conductive couple, the establishment of that force being due to a constant current discharge between these elements, and controlling the degree of attraction between them. This affinity is, especially, well adapted to useful employment when the couple elements are in contacting relative motion.

Fundamentally, the contacting materials must be capable of electrochemically producing a current blocking film or layer at the contacting areas of those elements on the discharge of current through the couple.

I have discovered that there is an electrostatic field established and exerting a considerable force between the contacting electropositive and electronegative bodies constituting the eletcrodes of an electrical couple in an electric circuit when a contacting current blocking layer has been formed by the electrochemical reaction between them, due to the disharge of current, and that that field and force are controllable by change of potential in the connecting circuit.

This electrostatic field or force which is maintained at a constant value by the application of a uniform direct current discharge, is sensitive to potential changes in that circuit. When variations in potential are impressed upon a connecting circuit, there are notable changes in the electrostatic force exerted between the couple elements. Therefore, if the elements are in frictional relationship, the friction or drag between them is affected in no inconsiderable degree, corresponding directly with the changes in the intensity of the electrostatic force. This principle, I have applied in my invention to effect high amplification of received electrical impulses for the reproduction of sounds and other signals.

The forming of the current blocking film or layer is fully described in my prior and copending applications bearing Serial Numbers 38,780, 51,524 and 69,215, and filed in the United States Patent Office respectively on June 22, Aug. 20, and November 16, 1925.

According to the terms of my invention, the device utilizes the asymmetrical conduction of a couple or pair of elements, to have which there must be between the elements a current blocking film of the proper character and without which the controllable electrostatic field does not exist and the device will not function. Through the control by received impulses of the electrostatic forces at the juncture of the electrode elements of the couple, other forces are controllable. The couple consists of an electrode of a conductive compound of an electropositive element in combination with a conductive electronegative compound of a metal with an element of the sixth periodic group, such as a conductive oxide, sulphide, selenide or telluride. The applicable electropositive materials are in the second and third periodic groups and are calcium, beryllium, magnesium, boron, aluminum, and zinc, while the electronegative or cathode element is a compound of a metal forming a conductive oxide, such as a magnetic oxide of iron, a sulphide or a combination of sulphides, a selenide or a telluride, in general, an electronegative electrically conductive compound having a film-forming characteristic.

For a couple to be capable of developing electrostatic forces, there must be an electrochemical divergence between the electrode materials and a difference in their respective specific resistances. The greater the relative electropositive characteristic of the anode material, the higher its film-forming tendency and the less the expenditure of energy required in effecting the electrochemical reaction between the electrodes, signifying a greater couple efficiency and low film-forming hysteresis losses.

The specific resistance of the materials is important as it governs the extent of the film formed by a given energy. Even distribution of the asymmetrically conductive layer is necessary to prevent intense localized current discharges at the contacting area.

By discharging a current between the contacting electrodes, there is an instantaneous electrochemical reaction, producing a current blocking film, and an establishment of an electrostatic field exerting a force between the electrodes; by then moving the electrodes in contact, the normal friction pull or dragging action is greatly increased or decreased depending on the characteristics of the potential applied. Changes in the frictional stress effected by modifications of the electrostatic force may be used to accomplish many different operations.

Employing in this way an electropositive material for which I prefer magnesium, in contact with an electronegative cathode composed of a conductive crystalline metallic compound of the sixth periodic group, such as, a sulphide of a zinc-copper compound, the current blocking film of extreme thinness is instantaneously produced and an intense electrostatic field is created about the contacting area.

For a better understanding of the invention, reference is made to the accompanying drawings illustrative of two embodiments thereof, concrete descriptions of which are set forth. The invention, however, is not limited in its application to the embodiments described.

Fig. 1 diagrammatically represents an application of one embodiment of the invention to the reproduction of sound, and Fig. 2 in like manner represents the invention as applied to the reception and retransmission of telegraph signals.

Referring more particularly to Fig. 1, at 1 is a magnesium anode disk, rotatable by motor M, and having on its surface a highly polished groove $1_a$, in which runs cathode needle 2, of sulphide of a zinc-copper compound (18% zinc and 82% copper). The cathode is prepared by exposing the zinc-copper compound to a temperature of 500 deg. C. in a sulphur vapor atmosphere and then after cooling, exposing in the air to a temperature of about 1000 deg. C. to drive off free and occluded sulphur and to effect a recrystallization of the mass; also to increase its specific resistance. Needle 2, is mounted on swivel $2_a$, its upper end being in contact with diaphragm 3 of sound box $3_a$, so that any rocking movement of the needle is transmitted to the diaphragm which, in turn, creates a corresponding movement of the air in the sound box and in the horn 4. In the input or receiving circuit C, needle 2 is connected as the negative pole and the disk 1, as the positive pole for the discharge of current from battery B. T represents a transformer through which oscillations are impressed upon circuit C.

In operation, disk anode 1 is rotated at a constant speed by motor M, and the electrode circuit is energized by battery B, which thereby effects the formation of the current blocking film at the electrode contacting area, and the establishment of an electrostatic force there, causing the cathode 2, to drag with increased friction against anode 1, moving in its polished groove $1_a$, under a fixed tension, causing a normal distortion of diaphragm 3. There is then no fluctuating or vibratory movement of needle 2, and hence of diaphragm 3, and substantially no sound is emitted through horn 4. But as a potential of circuit C, is varied, as by impressing oscillations from an alternating or varied current through transformer T, there is a corresponding change in the electrostatic field and the force between the electrodes and a like change in the frictional drag between those elements, with a change in the distortion of diaphragm 3, resulting in a responsive movement of air in the sound box $3_a$, and the emission of sound waves through horn 4. The changes in the electrostatic field correspond to the characteristics of the impressed current, sound being reproduced when the oscillations are at audio frequency, the effect being greatly amplified, and the usual distortion as when vacuum tubes are employed for amplification, is not present. The same principles are applicable for high speed relay operation.

Referring now to Fig. 2, the magnesium anode band 1, rests upon the polished periphery of the zinc-copper sulphide cathode drum 2, between which elements a current blocking film is formed and the electrostatic field established as described with reference to Fig. 1. Electrode band 1, is connected as the positive electrode in the circuit energized by battery B, through support 6, and the drum 2, is connected in that circuit as the negative pole, the contact being at $1_a$. One end of the anode is fixed to flexible metal band 8, carrying movable contact point 5, which contacts with fixed contact point $5_a$, a screw $5_b$, mounted on conductor 9, being provided to adjust the contact spacing. Both points are connected in the output or telegraph circuit 11. Spring 7, holds the anode under tension against the polished periphery of cathode 2. 10 is an insulation base plate.

In operation, as cathode 2, is rotated by motor M, at a constant speed, anode 1, resting upon it at $1_a$, a constant current being supplied by battery B, there is a frictional drag upon the anode that is just insufficient to bring the contact points 5 and $5_a$ together. But if the electrostatic force is sufficiently increased as by the addition of an incremental potential from oscillations impressed upon the input circuit C, through transformer T, the points come into contact because of increased frictional drag between the electrodes; there is corresponding response in the output circuit 11; or if the potential added is of opposite polarity, the tendency is to move the points apart due to a reduction of the density of the electrostatic field. The movement of contact point 5 corresponds to the frequency of the impressed oscillations, which can be of any desired frequency and can be amplified by any standard means, such as those now used in the radio art and otherwise.

What I claim is:

1. A relay device comprising an asymmetrically conductive couple adapted to receive and transmit signals by varying an electrostatic field between the elements of said couple in response to changes in the potential applied to the circuit connecting said elements.

2. A relay device comprising an asymmetrically conductive couple consisting of contacting conducting bodies having a contacting current blocking film therebetween, said bodies being adapted to be connected as opposing electrodes in an electric signalling circuit.

3. A relay device comprising an asymmetrically conductive couple, one of the elements of said couple being composed of a relatively electropositive material and another element of said couple being composed of a relatively electronegative material, said materials being capable of producing by electrochemical reaction therebetween, a contacting current blocking layer upon the discharge of current in the circuit connecting said elements, said elements being also connected in a signal receiving circuit.

4. A relay device comprising an asymmetrically conductive couple, one of the elements of said couple being composed of a relatively electronegative material and another element of said couple being composed of a relatively electropositive material, said materials being capable of producing by electrochemical reaction therebetween, a contacting current blocking layer upon the discharge of current in the circuit connecting said elements, said elements being also connected in a signal receiving circuit and said discharge maintaining an electrostatic force between said elements.

5. A relay device comprising an asymmetrically conductive couple, one of the elements of said couple being composed of a relatively electropositive material and another element of said couple being composed of a relatively electronegative material, said materials being capable of producing by electrochemical reaction therebetween, a contacting current blocking layer upon the discharge of current in the circuit connecting said elements, said elements being also connected in a signal receiving circuit, and means for varying the intensity of said force by varying the potential of a circuit connecting said elements.

6. A relay device comprising an asymmetrically conductive couple one of the elements of said couple being composed of a conductive metallic crystalline compound of the sixth periodic group and another of the elements of said couple being composed of a conductive compound of an electropositive material, the materials of said elements being capable of producing therebetween a contacting current blocking layer by the discharge of current in the circuit connecting said elements.

7. A relay device comprising an asymmetrically conductive couple, one of the elements of said couple being composed of a relatively electropositive material and another element of said couple being composed of a relatively electronegative material and having a contacting current blocking layer therebetween, formed by the discharge of current through said couple, means for maintaining the elements of said couple in frictional relationship at normally constant speed, and means for varying the electrostatic force between said elements by varying the potential of a circuit connecting said elements.

8. A relay device comprising an asymmetrical conductive couple, one of the elements of said couple being composed of a relatively electropositive material and another element of said couple being composed of a relatively electronegative material and having a contacting current blocking layer therebetween, formed by the discharge of current through said couple, means for maintaining the elements of said couple in frictional relationship at normally constant speed, and means for varying the electrostatic force between said elements by varying the potential of a circuit connecting said elements and means for translating variations of said electrostatic force into other impulses.

9. A relay device comprising an asymmetrically conductive couple having a cathode composed of a sulphide of zinc and copper compound and an anode composed of a relatively electropositive material and having a contacting current blocking layer therebetween, formed by the discharge of current through said couple, means for maintaining the elements of said couple in frictional relationship at normally constant speed, and means for varying the electrostatic force between said elements by varying the potential of a circuit connecting said elements.

10. A relay device comprising an asymmetrically conductive couple having an anode composed of magnesium and a cathode composed of a relatively electronegative material and having a contacting current blocking layer therebetween, formed by the discharge of current through said couple, means for maintaining the elements of said couple in frictional relationship at normally constant speed, and means for varying the electrostatic force between said elements by varying the potential of a circuit connecting said elements.

11. A relay device comprising an asymmetrically conductive couple having a cathode composed of a sulphide of a zinc and copper compound and an anode composed of magnesium and having a contacting current blocking layer therebetween, formed by the discharge of current through said couple, means for maintaining the elements of said couple in frictional relationship at normally constant speed, and means for varying the electrostatic force between said elements by varying the potential of a circuit connecting said elements.

Signed at New York city in the county of New York and State of New York this 13th day of February, A. D. 1926.

SAMUEL RUBEN.